US006873961B1

(12) United States Patent
Thorpe et al.

(10) Patent No.: US 6,873,961 B1
(45) Date of Patent: Mar. 29, 2005

(54) METHOD AND APPARATUS FOR IDENTIFYING AND TRACKING PROJECT TRENDS

(75) Inventors: Steven W. Thorpe, North Kingstown, RI (US); Robert C. Higgins, Tiverton, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 800 days.

(21) Appl. No.: 09/152,471

(22) Filed: Sep. 9, 1998

(51) Int. Cl.[7] .............................................. G06F 17/60
(52) U.S. Cl. ................................. 705/7; 705/8; 705/9
(58) Field of Search ..................................... 705/9, 7–8

(56) References Cited

U.S. PATENT DOCUMENTS

| | | | | |
|---|---|---|---|---|
| 4,751,635 A | * | 6/1988 | Kret ........................... | 364/200 |
| 5,696,702 A | * | 12/1997 | Skinner et al. ........ | 364/551.01 |
| 5,737,727 A | * | 4/1998 | Lehmann et al. ............... | 705/7 |
| 5,765,140 A | * | 6/1998 | Knudson et al. ................ | 705/9 |
| 5,930,798 A | * | 7/1999 | Lawlet et al. ................ | 707/102 |

OTHER PUBLICATIONS

MacDonald, Gordon, "Managing the Engineering Process", Consulting–Specifying Engineer, Denver; Oct., 1997.*
Boehm, Barry W. "Software Engineering Economics", IEEE Transactions on Software Engineering, vol. SE–10, No. 1, Jan. 1984, pp. 4–21.*
Microsoft Project Business Project Planning System manual Version 4.1 for Windows 95, Microsoft Corporation, Redmond, WA, 1995.*
Microsoft Excel for Windows, Microsoft Corporation, Redmond, WA : Microsoft Corp., 1992.*
Stutt, Walter J., "Single–entry online progress measurement", Transactions of AACE International, 1997, pp. 197–201.*
Brooks, Frederick P.. Jr., Mythical Man–month, Addison–Wesley, 1994 as republished in Software Engineering Project Management, IEEE Computer Society Press, 1988, pp. 3–10.*
Martin, Bruce A. Aspects of Cost Control. Cost Engineering, Jun. 1992, v34, n6, pp. 19–23.*
Ragsdale, Cliff T. Spreadsheet Modeling and Decision Analysis. Cincinnati: South Western College, 1997, pp. 369–374.*
Strutt, Walter J., "Single–entry online progress measurement", Transactions on AACE International, 1997, pp. 197–201.*

* cited by examiner

Primary Examiner—Romain Jeanty
(74) Attorney, Agent, or Firm—James M. Kasischke; Michael F. Oglo; Jean-Paul A. Nasser

(57) ABSTRACT

A method and apparatus for computer-assisted project analysis. Planned values for successive times for each of a plurality of parameters are stored in a database. Another database receives measured values of the parameters at the successive times. A statistical analysis including comparison, correlation and differentiation functions generate a set of output functions that then are displayed to assist in the analysis of the project.

12 Claims, 6 Drawing Sheets

METHOD AND APPARATUS FOR IDENTIFYING AND TRACKING PROJECT TRENDS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to computer-assisted project management and more specifically to a method and system for tracking and identifying trends in a project.

(2) Description of the Prior Art

The accurate identification of project trends is extremely important in determining whether a particular project is on schedule and will remain on schedule. Typically a project manager, system analyst, or like individual, selects certain parameters, or metrics, relevant to a project. In complicated projects the number of possible parameters are so large that an individual generally identifies a manageable subset of parameters and then determines variances, correlations and the like of the parameters in the subset manually. Consequently an individual may overlook particularly important parameters. Moreover, the evaluation process is very subjective and different analysts may analyze the same project using different parameters and arrive at different conclusions. Thus, it is possible even for an experienced analyst to overlook certain parameters that might, if they were analyzed individually or in combination with other parameters, provide a conclusion on the basis of a prediction of risk that otherwise would not be identified.

Computers have been used in the field of project management, but their use is usually limited to some specific areas or tasks. For example, United States Letters Patent, 5,229,948 (1993) to Wei et al. discloses a method of optimizing a serial manufacturing system. This method provides a quantitative state-space model of a serial manufacturing system that describes the processing in terms of sensitivity information and performance in terms of part production and storage/retrieval. The method additionally senses new sensitivity information that results from stimulating the manufacturing system with a model using estimate system performance information and adjusting the performance information iteratively by using new sensitivity information in an optimization algorithm to provide an adjustment simultaneously with the simulation.

United States Letters Patent No. 5,452,218 (1995) to Tucker et al. discloses a systems and method for determining quality analysis on fabrication and/or assembly design using shop capability data. Capability data is collected and stored in a database accessible to all users. A worksheet is used to model a manufactured product using process capability data retrieved from the database. The system displays the defects and totals them according to predetermined criteria to produce a measure of quality.

United States Letters Patent No. 5,523, 960 (1996) to Jeong discloses a method for evaluating assembly sequences. The method includes the steps of designing an assembly composed of a plurality of parts, preparing a component relation diagram indicating the joint relation between the plurality of parts, reducing assembly sequences containing infeasible subassemblies by computing weights of all the subassemblies of the respective processes and evaluating the feasible assembly sequences obtained through a function that incorporates data concerning weghting, ease of part joining, tool changes criteria and other criteria.

United States Letters Patent No. 5,615,138 (1997) to Tanaka et al. discloses a method for establishing the working mantime in a production line. This method includes numerically evaluating the work volume for a work station performed in each production process and representing the numeralized work volume as a normal work mantime. A numerical evaluation of the fatigue extent of each fatigue task as fatigue score is added to the normal work mantime. The fatigue score is also assigned a fatigue recovery mantime and the normal work mantime, which included the fatigue recovery mantime, is leveled as uniform thereby establishing a new production process which includes level fatigue mantime.

United States Letters Patent No. 5,692,125 (1997) to Schloss et al. discloses a system and method for scheduling linked events with fixed and dynamic conditions. Events are also checked at one or more times between a scheduling time and a performance time. During this check, certain dynamic conditions associated with events are checked to determine whether dynamic conditions are satisfied. If they are, the events are confirmed for performance. If one or more dynamic conditions are not satisfied, the events are modified. Events can be modified by canceling, altering or postponing. When an event is modified, a notification is transmitted and modification may cause one or more subsequent events to be modified.

Each of the foregoing references discloses a system directed to a particular narrow aspect of project management such as quality and timing. None suggest any method or apparatus for providing quantitative data that can be used to evaluate overall project performance and the steps to be taken to maintain performance. Moreover, each of these methods responds only to limited subsets of data so the data being used is not comprehensive with respect to an entire project.

SUMMARY OF THE INVENTION

Therefore it is an object of this invention to provide a computer-assisted method and system for analyzing and evaluating the overall state of a project.

Still another object of this invention is to provide a computer-assisted method and system for providing a comprehensive analysis of the progress of a project.

Still another object of this invention is to provide a computer-assisted method and system for providing quantitative measurements useful in managing a project.

In accordance with this invention, the progress of a project against a plurality of predetermined project parameters includes storing, in a computer processing apparatus, a predetermined list of parameters and planned values for those parameters at predetermined successive intervals. Measured values of each parameter at those intervals are also stored in the apparatus. A statistical analysis conducted in the computer processing apparatus, based upon the measured values and the corresponding planned values, identifies a set of output functions that can be displayed as information from which an evaluation of the project process may be obtained.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
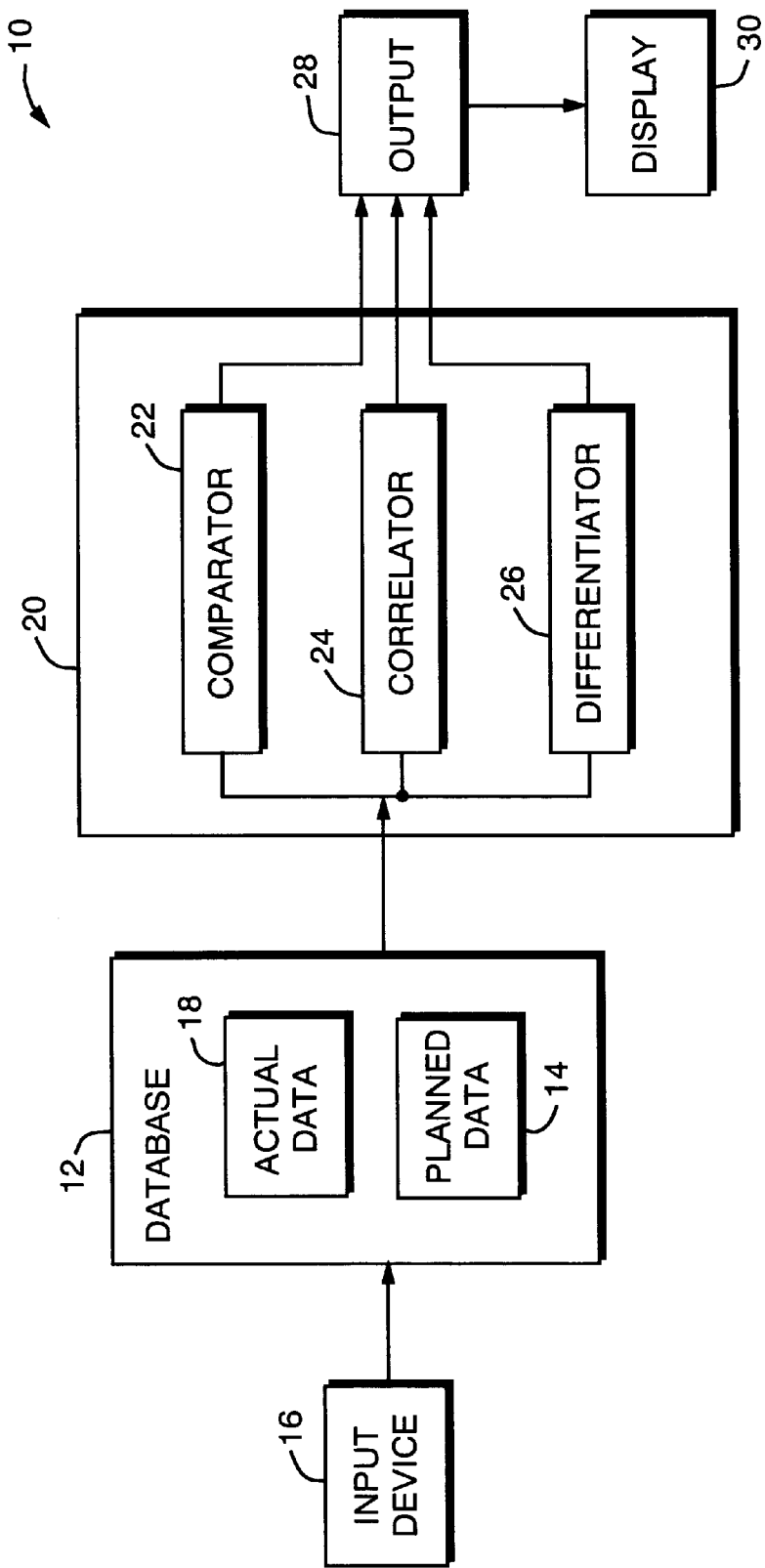
FIG. 1 is a block diagram of a system constructed in accordance with this invention.

A computer-based system 10 constructed in accordance with this invention includes modules that are depicted functionally in FIG. 1. A database module 12 stores information concerning planned and actual values of various process or project parameters. A planned data store 14 in the database module 12 receives, through the means of an input device 16, a list of project parameters, or "metrics", and a projected value of the parameter for each of successive sampling times. The sampling time may be minutes, hours, days, weeks or months.

At each sampling time during the duration of the input, device 16 enables actual data to be loaded periodically into an actual data store 18 with a corresponding sampling time. Typically the actual data will be stored as absolute, as opposed to incremental, numbers.

When it is desired to analyze a project, an operator initiates a statistical analysis subsystem 20 that includes, in this particular embodiment, a comparator module 22, a correlator module 24 and a differentiator module 26. Specific functions of each of these modules are described later. An output 28 integrates and stores the output from each of the modules for each sampling time and provides data for a display 30 from which a system analyst identifies various trends in the project.

Figure 2:
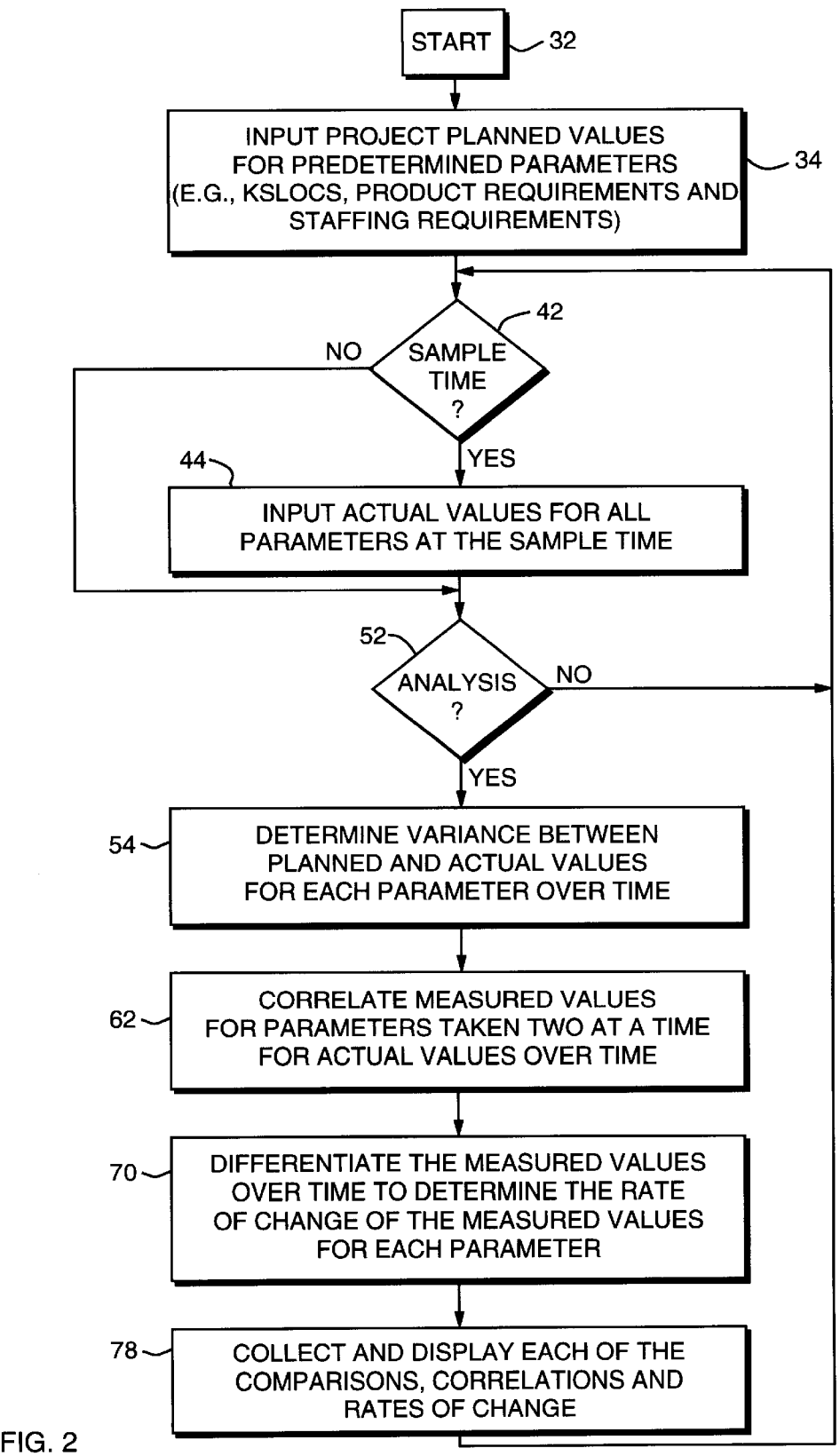
FIG. 2 is a flow chart that depicts a method of operation of the system of FIG. 1.

The operation of system 10 in FIG. 1 can be more fully understood with reference to FIG. 2 which represents this operation as a procedure with a start step 32 that initializes the system and then transfers control to step 34 where an individual uses the input device 16 to load planned data into the planned data store 14. Although a large number of parameters can be loaded, for purposes of understanding this invention, it will be helpful to describe a hypothetical software development project in terms of three parameters. These include (1) the number of lines of code, or KSLOC parameter; (2) product (or system) design or functional requirements; and (3) staff requirements. The KSLOC parameter represents the thousands of lines of code. Product requirements identify the number of different functions to be performed by the software being developed. Staffing requirements represent person-years or numbers of personnel or other staffing variables. These are placed in the planned data store according to the projections or model being utilized.

Figure 3:
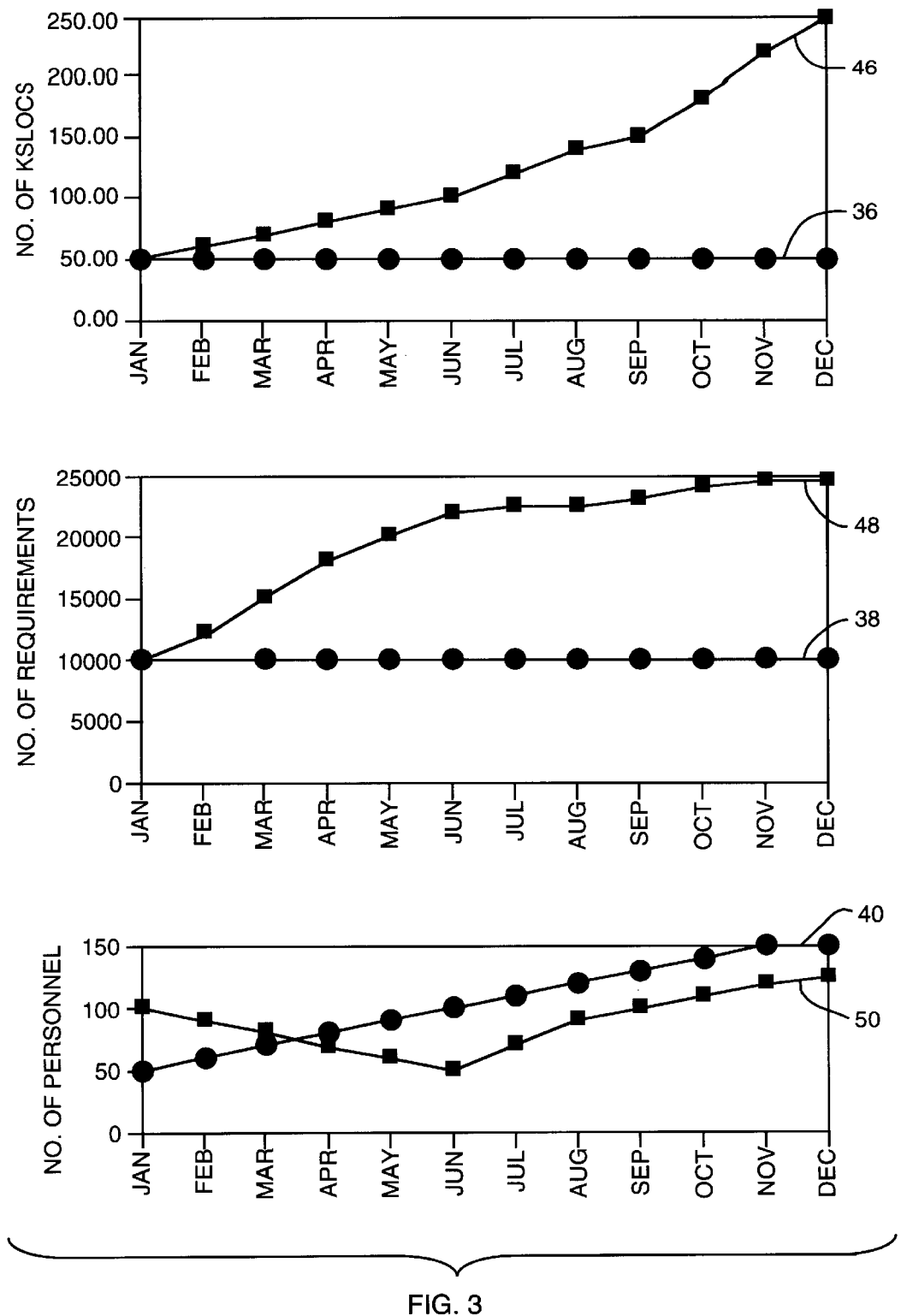
FIG. 3 depicts data for one specific application that is useful in understanding this invention.

Referring also to FIG. 3, there is depicted the planned data for this hypothetical project. Graph 36 shows an anticipation that a product or system will have 50,000 lines of code; graph 38, a planned number of requirements of 10,000; and graph 40, planned personnel requirements that increase linearly from 50 individuals in January to 150 individuals in November. Each of these graphs assumes a one-year delivery time for this project and a monthly sampling period. Data identifying these graphs would be stored in an appropriate form for each month in the planned data store 14 in FIG. 1.

Once this process, as shown by step 34 in FIG. 2, is complete, control passes to step 42 which determines whether a sample time exists. When it does, as, for example, at the end of a month, actual values for all the parameters are stored in the actual data store 18 in step 44. Referring to FIG. 3, values of 50 for the KSLOC parameter, 10,000 for the product requirements parameter and 100 for the staffing requirements parameter are loaded for January.

Still referring to FIG. 3, the graphs that are presented are based upon all the actual values entered on a monthly basis over a one-year interval. Graph 46 shows that the KSLOC parameter increased from 50 lines of code in January to 250 line's of code in December, well above the planned level depicted by graph 36. Graph 48 depicts an increase in the number of requirements from 10,000 to 25,000 which represents an increase over the projected or planned 10,000 requirements depicted by graph 38. Graph 50 depicts the actual staffing levels which began at 100 in January, decreased linearly to 50 in June and then increased back to 100 by December.

Figure 4:
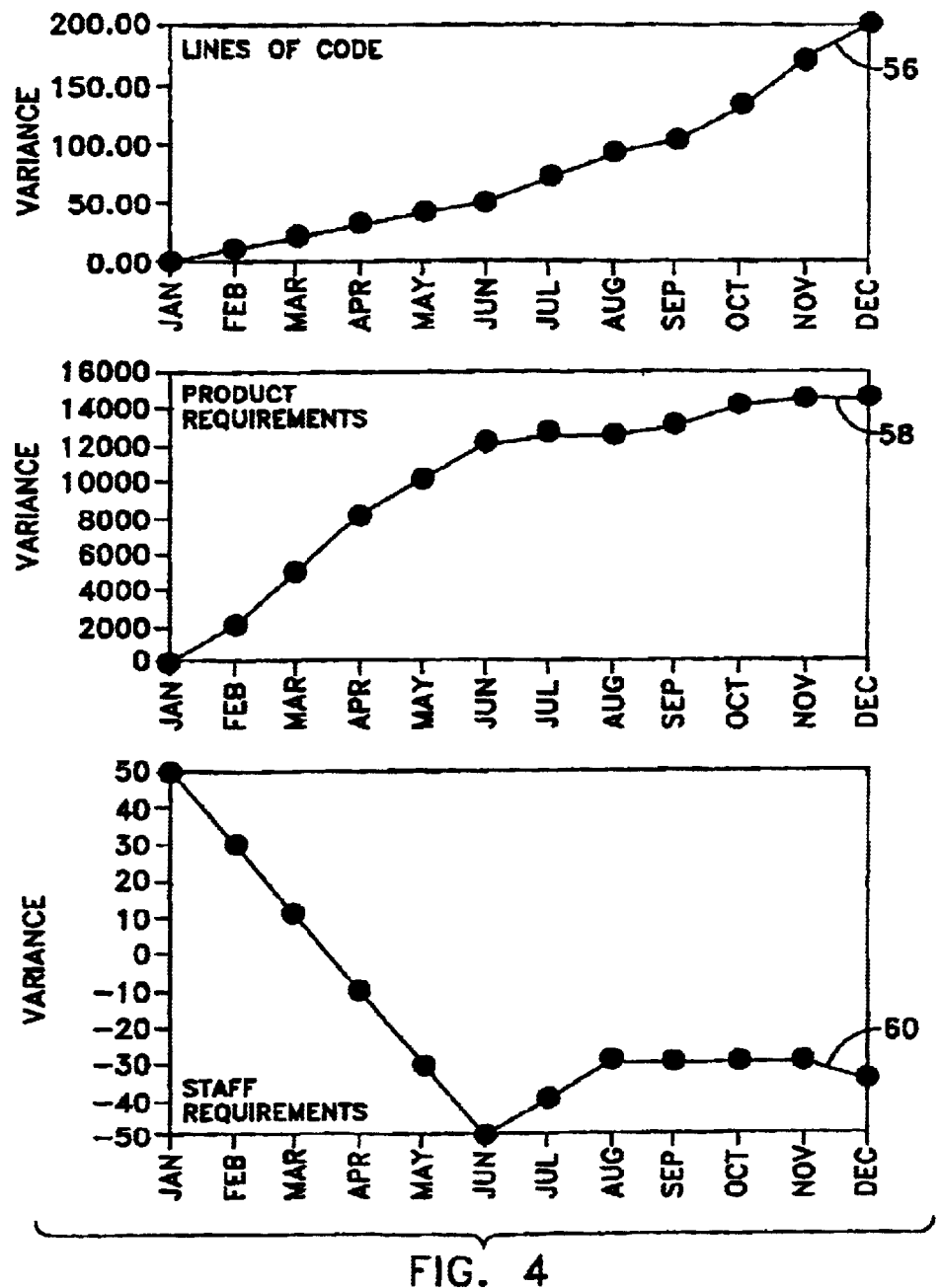
FIGS. 4 through 6 depict the results of the analysis conducted in the system of FIG. 1.

When all of the data underlying the graphs depicted in FIG. 3 has been entered into the actual data store 18 for a given sampling interval, an external control, such as an analyst choosing to activate the statistical analysis module 20 in FIG. 1 cause step 52 of FIG. 2 to obtain an analysis based upon values in data base module 12. Step 52 can also be configured to monitor the accumulated input data and to determine automatically if sufficient data for an analysis has been input and proceed to activate module 20 with no intervention by an analyst. In step 54 the comparator module 22 determines the variances between the planned and actual values for each parameter over time. The variances for each of the parameters depicted in FIG. 3 are shown in FIG. 4. That is, graphs 56, 58 and 60 depict the variances in the lines of code, product requirements and staff requirements for each month. From these graphs collectively an analyst can determine that the program has been increasing in software size and project requirements when compared with the base line or planned levels. It can also be seen that the program was overstaffed at the beginning of the project and then remains below the planned levels.

Figure 5:
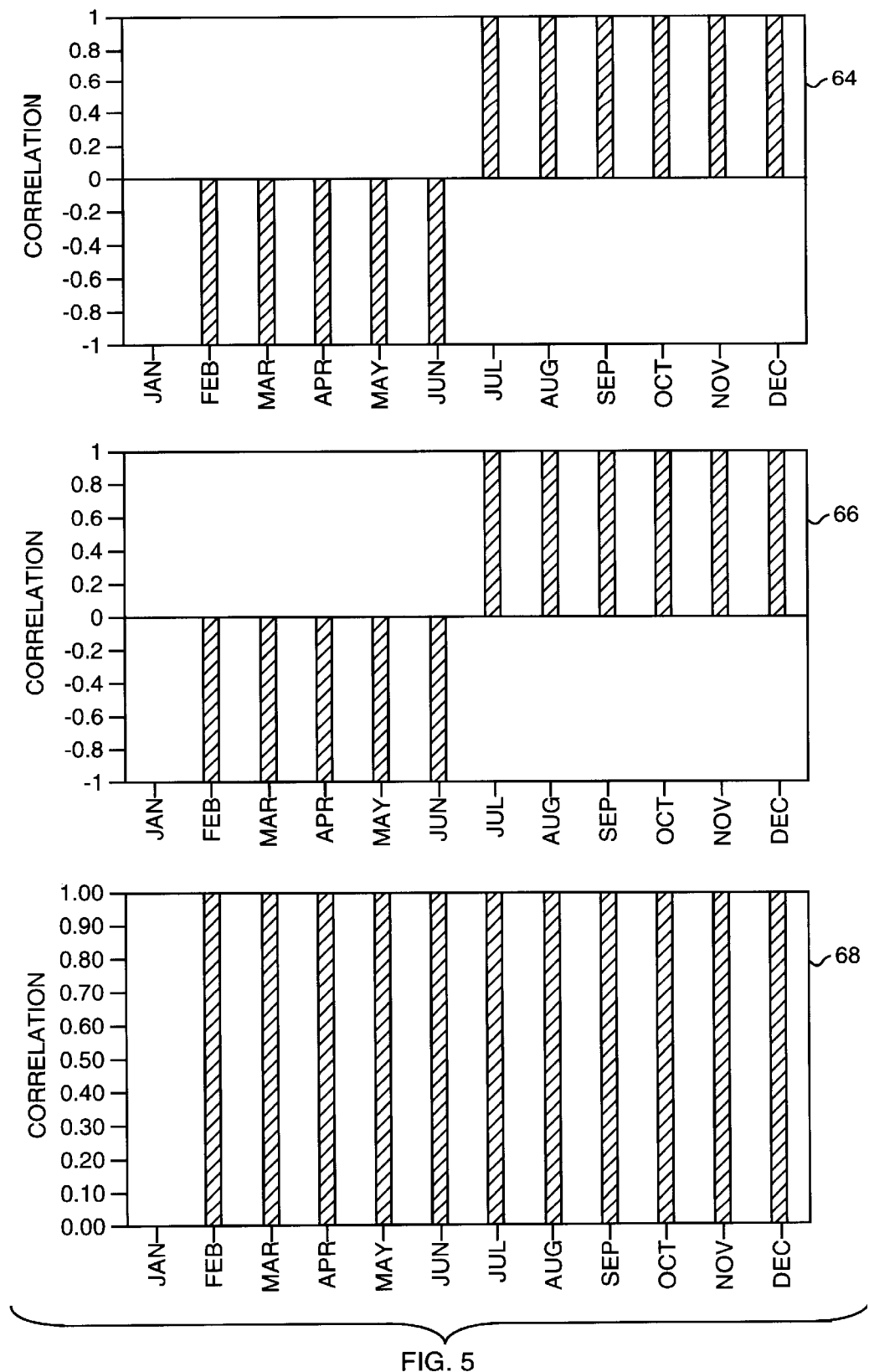

In step 62 of FIG. 2 the correlator module 24 of FIG. 1 provides correlation between each pair of parameters. The results for the data shown in FIG. 3 are depicted in FIG. 5 wherein graph 64 depicts the correlation between the KSLOC and staffing requirement parameters; graph 66, between the product and staffing requirements parameters; and graph 68, between the KSLOC and product requirements parameters. As might be expected, graph 68 depicts a high correlation between the lines of code: and product requirements parameters. This provides some level of confidence in the measurements for those two parameters. Graphs 64 and 66 indicate that over the first portion of the project the KSLOC and staffing requirements parameters and the product and staffing requirements parameters are negatively correlated over the first part of the project, but highly correlated over thee second half of the project. This is indicative of a problem that existed early in the program, but is beginning to be resolved.

Figure 6:
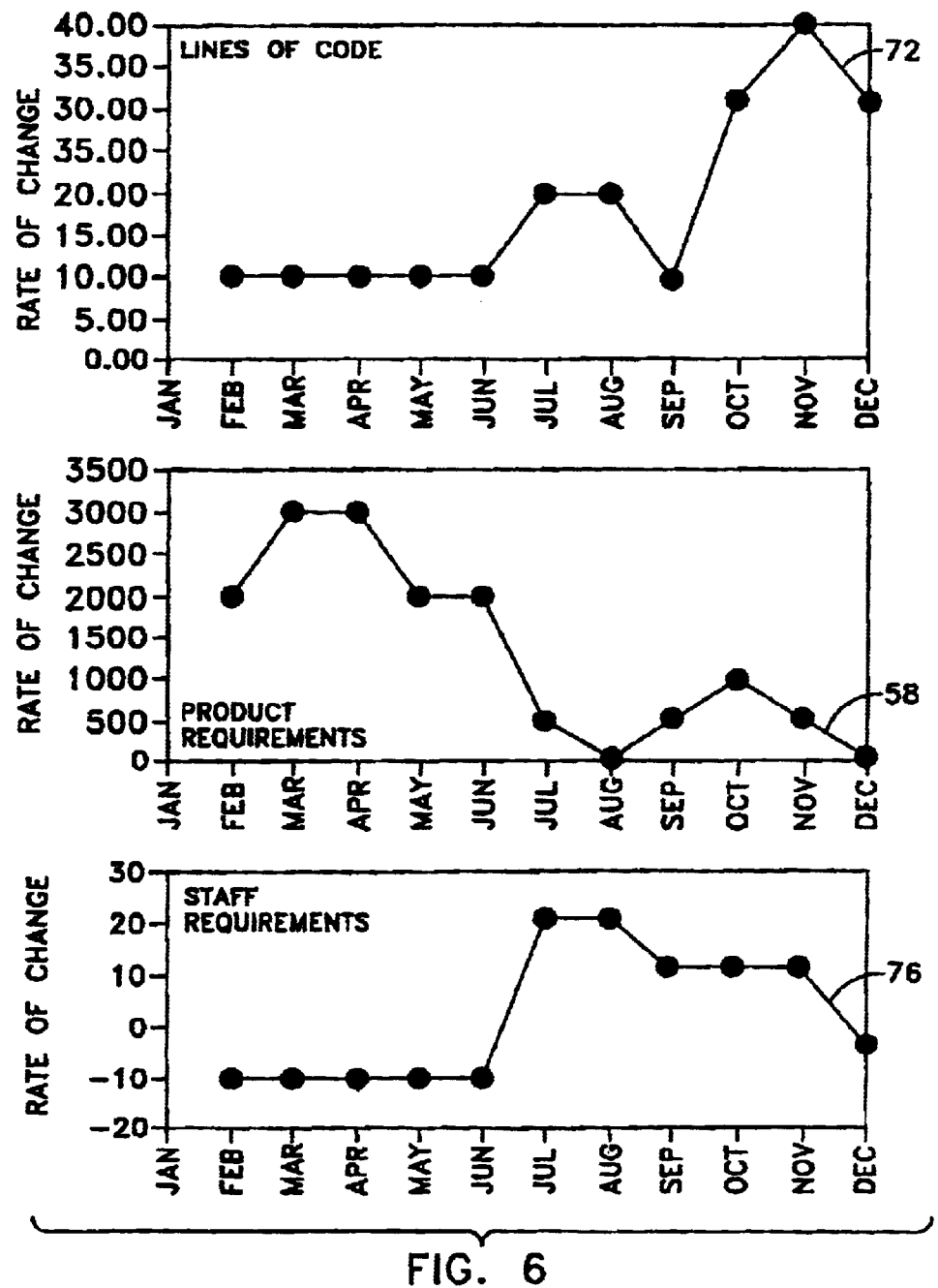

At step 70 in FIG. 2, the differentiator module 26 of FIG. 1 differentiates the measured values over time to determine the rate of change of the measured values for each actual data value. Graphs 72, 74 and 76 in FIG. 6 depict the differentiator outputs for the three parameters of this example. The differentiator output of the KSLOC parameter graph 72, indicates the actual value is increasing throughout the term but at different rates of change. Product requirements, as depicted in graph 74, are increasing with a moderating rate of change. Graph 76 indicates staffing is decreasing as a constant rate during the first half of the project, begins to increase in June, then subsequently moderates after August.

At step 78 of FIG. 2, data for the graphs are collected in the output 28 and transferred to the display 30. The displayed data for this sample project collectively describe a project with a potential problem. This specific information suggests a staffing problem because the increases in software size and requirements have not been matched by increases in staffing. Thus, an analyst could begin to take corrective measures to bring the system into compliance with the planned data information by increasing staff, assuming no other parameters constrain such a change. Moreover, it will be apparent that such information might actually be used beginning even part way through the program as depicted in FIGS. 3 through 6 when the correlation of staffing with both lines of code and requirements was negative.

It will be apparent that these three parameters have been particularly chosen as a subset of parameters to minimize the explanation of an embodiment of this invention. In actual practice the number of parameters would be greatly increased. As the number increases, the correlator module 24 will be helpful in determining those parameters that are more reliable. The comparator and differentiator modules 22 and 26 then can provide additional information concerning those reliable parameters. Other parameters that might be collected for analysis purposes include the number of system or product defects discovered during testing, the number of design components, costs, labor hours, problem reports and others.

In accordance with this invention, the significant time requirements for analyzing even a small subset of parameters under conventional approaches are eliminated. An individual will have more time to analyze the output data to observe trends that may indicate potential program risks and to anticipate risks based upon the data provided by this invention. Furthermore by selecting a wide set of parameters that are easily monitored, it is also possible to provide a higher level of comprehensiveness and standardization of the analytical process and a quantitative assessment of the data.

Although a system constructed in accordance with this invention will comprise the comparator module 22, correlator module 24 and differentiator module 26, still other modules could be added to the analysis system. For example, if parameters involving frequency information are available, a spectrum analysis module could be added to the statistical analysis module 20 of FIG. 1.

Consequently, while this invention has been disclosed in terms of certain embodiments, it will be apparent that many modifications can be made to the disclosed apparatus without departing from the invention. Therefore, it is the intent of the appended claims to cover all such variations and modifications as come within the true spirit and scope of this invention.

What is claimed is:

1. A method for analyzing, in a processing apparatus, the progress of a project against a plurality of predetermined project parameters comprising the steps of:

storing in the processing apparatus for a predetermined list of parameters and planned values for successive times, said project parameters and planned values related to at least one of lines of code, product requirements, and staff requirements;

storing in the processing apparatus measured values of each of the project parameters measured at successive times;

statistically analyzing in the processing apparatus the measured values of the project parameters and the corresponding values of the predetermined project parameters thereby to identify a set of output functions including generating at least one correlation for one pair of project parameters on the predetermined list and generating variances of the measured value from the planned value for each parameter over time; and displaying each output function including each correlation as information from which an evaluation of the project progress may be obtained.

2. A method as recited in claim 1 wherein said statistical analysis additionally includes generating rates of change for the measured values of each parameter over time.

3. A method as recited in claim 1 wherein said statistical analysis additionally includes generating variances of the measured value from the planned value for each parameter over time.

4. A method as recited in claim wherein said statistical analysis additionally generates rates of change for the measured values of each parameter over time.

5. A method as recited in claim 1 additionally comprising the step of initiating the analysis under external control.

6. A method as recited in claim 1 additionally comprising the steps of:

monitoring the stored values; and automatically activating said analysis in response to the existence of an adequate accumulation of stored values.

7. Apparatus of analyzing the progress of a project against a plurality of parameters comprising:

first storage means for storing, for a predetermined list of different types of project parameters and planned values for successive times, and said project parameters and planned values related to at least one of lines of code, product requirements, and staff requirements;

second storage means for storing measured values of the different types of project parameters measured at successive times;

means for statistically analyzing the measured values in said second storage means and the corresponding planned project parameter values from said first storage means thereby to identify a set of output functions, said analyzing means including means for generating for at least one correlation output function that is a correlation between at least one pair of the different project parameters and means for generating variances of the measured value from the planned value for each parameter over time; and means for displaying each output function icnluding each correlation as information from which an evaluation of the project progress may be obtained.

8. Apparatus as recited in claim 7 wherein said statistical analysis means additionally includes means for generating rates of change for the measured values of each parameter over time.

9. Apparatus as recited in claim 7 wherein said statistical analysis means additionally includes means for generating variances of the measured value from the planned value for each parameter over time.

10. Apparatus as recited in claim 7 wherein said statistical analysis means additionally includes means for generating rates of change for the measured values of each parameter over time.

11. Apparatus as recited in claim 7 additionally comprising means for initiating said analysis means in response to an external control.

12. Apparatus as recited in claim 7 additionally comprising:

means for monitoring the stored values; and means for automatically activating said analysis means in response to the existence of an adequate accumulation of stored values.

* * * * *